Dec. 3, 1929.  V. P. O'CONNOR  1,737,941
HOSE CONNECTION
Filed Nov. 29, 1926

INVENTOR
V. P. O'CONNOR
BY
Harry C. Schroeder
ATTORNEY

Patented Dec. 3, 1929

1,737,941

UNITED STATES PATENT OFFICE

VINCENT P. O'CONNOR, OF OAKLAND, CALIFORNIA

HOSE CONNECTION

Application filed November 29, 1926. Serial No. 151,288.

The present invention reates to improvements in hose connections and is particularly intended to be useful in connection with fire apparatus. When setting up fire fighting apparatus, the first operation usually is to connect one end of a hose to a hydrant and to then unwind it from the reel to bring the discharge end thereof into the proximity of the fire and to immediately open the faucet connected with the hydrant so that the water may be applied without any loss of time. If it is desired to increase the pressure of the hydrant, it is necessary to connect a pump into the system and it is essential that this pump be connected without disturbing the flow of the water. The present invention is designed to provide a hose connection which allows water to be withdrawn from the hydrant either directly or thru the medium of a pump, the hose connection being so constructed that the change may be effected without interfering with the flow of the water. Further objects and advantages of my invention will appear as the specification proceeds.

The preferred form of my invention is illustrated in the accompanying drawing in which—

Figure 1:
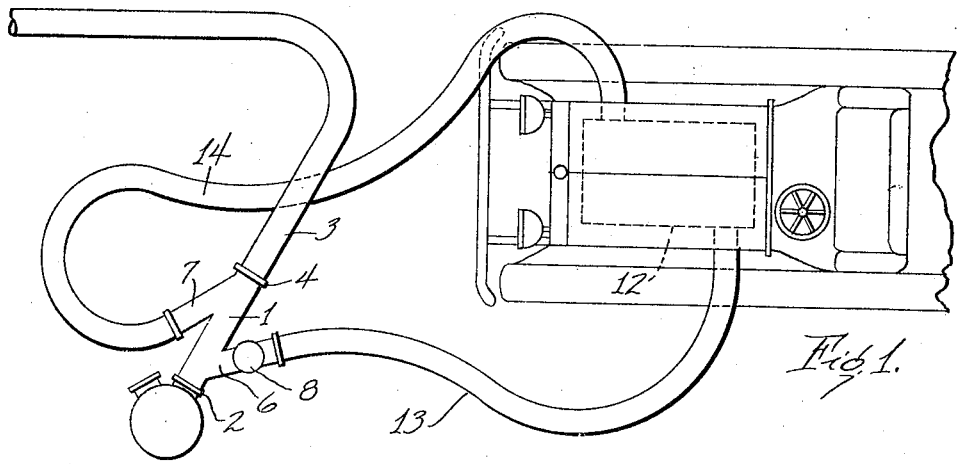
Figure 2:
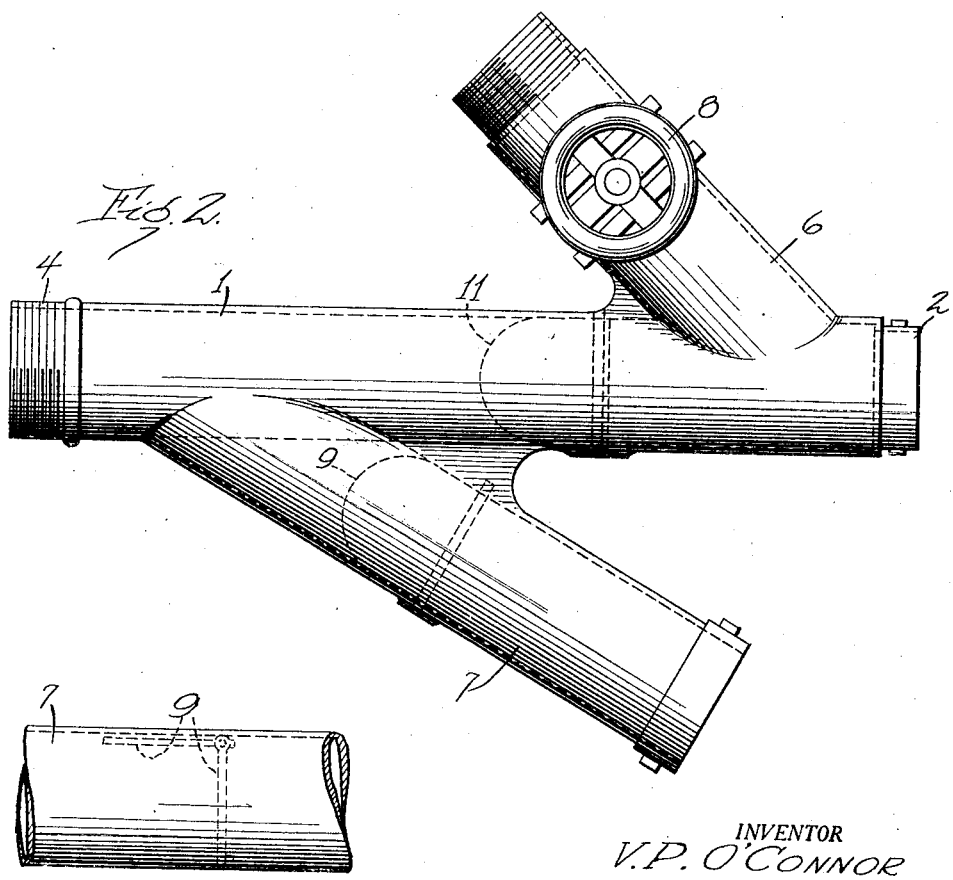
Figure 3:
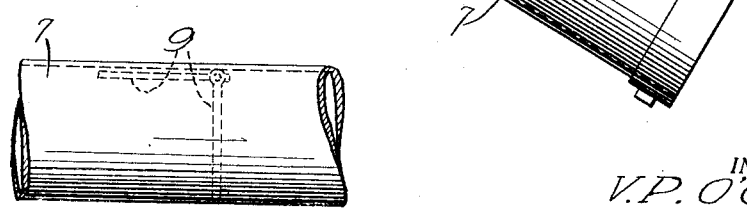

Figure 1 shows my hose connection attached to a hydrant and to a pump so as to allow water to be withdrawn directly from the hydrant or thru the medium of the pump, Figure 2 an enlarged top plan view of my hose connection, and Figure 3 a fragmentary side view, showing a portion of my connection with a valve therein.

While I have shown only the preferred form of the invention, I wish to have it understood that various changes or modifications may be made within the scope of the claims hereto attached without departing from the spirit of the invention.

My hose connection comprises a pipe or conduit 1 adapted for connection to a fire hydrant at one end as at 2 and for connection to a fire hose 3 as shown at 4. The conduit is provided with two branches 6 and 7, the branch 6 slanting forwardly in the direction of the flow of the water and the branch 7 slanting into the opposite direction. The branch 6 has a manually operated valve 8 therein and the branch 7 is provided with a clapper valve 9 which opens when water flows thru the branch into the conduit 1 and automatically closes when pressure is exerted in the opposite direction. A similar clapper valve 11 is provided in the conduit 1 itself between the two branches, this valve opening when water flows thru the conduit from the hydrant to the hose and closing when pressure is exerted in the opposite direction.

A pump 12 of any suitable design is connected with its suction side with the branch 6 thru the hose 13 and on its delivery side with the branch 7 thru the hose 14. The manner of using my connection is as follows: As soon as the fire apparatus arrives, the end of the hose which is carried on a reel is connected thru my connection with the nearest fire hydrant, and the reel unrolled so as to bring the other end of the hose into the proximity of the fire. As soon as the hose is ready to receive the water, the faucet of the hydrant is opened so that water may begin to flow immediately thru the main conduit 1. If it is desired to increase the pressure of the water, the two branches are connected to the pump 12 in the manner shown in Figure 1 whereupon the valve 8 is opened. The water, instead of running thru the main conduit 1, will now be drawn into the branch 6 and into the pump and is finally discharged thru the hose 14 and the branch 7 into the outer end of the conduit at an increased pressure.

It will be noted that as long as the water flows directly thru the conduit 1, the valve 8 is maintained closed and the pressure of the water closes the clapper valve 9 while it opens the clapper valve 11. When the pump is connected into the circuit, the valve 8 is opened manually and the pressure of the water opens the clapper valve 9, while at the same time the increased pressure of the water entering thru the branch 7 has a tendency to close the valve 11 in the main conduit.

I claim:

1. A fitting for fire hydrants comprising a conduit threaded at one end to receive a fire hose, a branch extending from said conduit at a point adjacent one end thereof, a second branch extending from said conduit at a point adjacent the other end thereof, said branches extending outwardly from said conduit at an incline thereto, said branches being substantially parallel, a valve in one of said branches, a check valve in the other of said branches, and a check valve in said conduit between said branches.

2. A fitting of the character described comprising a conduit threaded at one end, a branch extending from said conduit at a point adjacent one end thereof, a second branch extending from said conduit at a point adjacent the other end thereof, said branches lying at an inclined angle to the axis of the conduit and parallel to each other and a check valve in said conduit between said branches.

In testimony whereof I affix my signature.

VINCENT P. O'CONNOR.